(12) United States Patent
Shelton et al.

(10) Patent No.: US 11,198,428 B2
(45) Date of Patent: Dec. 14, 2021

(54) VEHICLE SYSTEM AND METHOD FOR REMOTE START OPERATION

(71) Applicant: Ford Global Technologies, LLC, Dearborn, MI (US)

(72) Inventors: Matthew John Shelton, Grosse Ile, MI (US); Michael Glenn Fodor, Dearborn, MI (US); Todd Anthony Rumpsa, Saline, MI (US); Patrick J. Curran, Northville, MI (US); Urs Christen, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 141 days.

(21) Appl. No.: 16/597,024

(22) Filed: Oct. 9, 2019

(65) Prior Publication Data

US 2021/0107453 A1 Apr. 15, 2021

(51) Int. Cl.
*B60W 30/00* (2006.01)
*B60R 25/20* (2013.01)
(Continued)

(52) U.S. Cl.
CPC .......... *B60W 30/00* (2013.01); *B60R 25/209* (2013.01); *B60T 1/005* (2013.01); *B60T 7/02* (2013.01); *B60T 13/52* (2013.01); *B60T 13/74* (2013.01); *B60W 10/02* (2013.01); *B60W 10/06* (2013.01); *B60W 10/182* (2013.01); *B60W 10/184* (2013.01); *B60W 10/196* (2013.01);
(Continued)

(58) Field of Classification Search
CPC ......... B60W 30/00; B60W 2510/0208; B60W 2510/18; B60W 2710/06; B60W 2710/021; B60W 10/184; B60W 10/06; B60W 10/02; B60W 10/182; B60W 10/196; B60W 2552/15; B60W 2710/18; B60R 25/209; F16D 28/00; F02N 11/0807; F02N 2200/0803; F02N 2200/101; F02N 2200/102; F02N 2200/103; F02N 2200/124; B60K 6/387; B60Y 2200/92; B60T 2210/20; B60T 7/02; B60T 1/005; B60T 13/74; B60T 13/52

See application file for complete search history.

(56) References Cited

U.S. PATENT DOCUMENTS 3,751,919 A * 8/1973 Ron ...................... B60T 13/162
60/553
5,632,796 A 5/1997 Kremmling et al.
(Continued)

FOREIGN PATENT DOCUMENTS

CA 2502885 A1 3/2005

*Primary Examiner* — Justin Holmes
(74) *Attorney, Agent, or Firm* — Geoffrey Brumbaugh; McCoy Russell LLP (57) ABSTRACT

A vehicle system and method for remote start operation in the vehicle system are provided. The method includes responsive to receiving a remote start request and while the vehicle is stationary, automatically engaging a wheel-arresting device coupled to a wheel in the vehicle. The method also includes when an electronically actuated clutch is automatically disengaged and subsequent to the automatic engagement of the wheel-arresting device, implementing remote start operation in an engine, where the wheel-arresting device is distinct from a secondary vehicle brake.

17 Claims, 4 Drawing Sheets

(51) Int. Cl.

| | | |
|---|---|---|
| *B60T 7/02* | (2006.01) | |
| *F16D 28/00* | (2006.01) | |
| *B60T 1/00* | (2006.01) | |
| *B60T 13/74* | (2006.01) | |
| *B60T 13/52* | (2006.01) | |
| *B60W 10/184* | (2012.01) | |
| *B60W 10/06* | (2006.01) | |
| *B60W 10/02* | (2006.01) | |
| *B60W 10/18* | (2012.01) | |
| *B60W 10/196* | (2012.01) | |
| *F02N 11/08* | (2006.01) | |
| *B60K 6/387* | (2007.10) | |

(52) U.S. Cl.
CPC .......... *F02N 11/0807* (2013.01); *F16D 28/00* (2013.01); *B60K 6/387* (2013.01); *B60T 2210/20* (2013.01); *B60W 2510/0208* (2013.01); *B60W 2510/18* (2013.01); *B60W 2552/15* (2020.02); *B60W 2710/021* (2013.01); *B60W 2710/06* (2013.01); *B60W 2710/18* (2013.01); *B60Y 2200/92* (2013.01); *F02N 2200/0803* (2013.01); *F02N 2200/101* (2013.01); *F02N 2200/102* (2013.01); *F02N 2200/103* (2013.01); *F02N 2200/124* (2013.01)

(56) References Cited

U.S. PATENT DOCUMENTS

| | | |
|---|---|---|
| 7,324,879 B2 | 1/2008 | Blyden et al. |
| 7,532,959 B2 | 5/2009 | Ochs et al. |
| 9,322,381 B2 | 4/2016 | Cousins et al. |
| 9,915,303 B1 | 3/2018 | Parada Centeno et al. |
| 2006/0052911 A1 | 3/2006 | Ochs et al. |
| 2009/0251284 A1 | 10/2009 | Wilson et al. |
| 2014/0278025 A1* | 9/2014 | Flick ...................... F16H 61/00 701/113 |
| 2015/0073675 A1* | 3/2015 | Malone ................. B60W 10/06 701/70 |
| 2018/0037206 A1* | 2/2018 | Antanaitis ............... B60T 11/26 |
| 2018/0051758 A1* | 2/2018 | Parada Centeno ..... F16D 13/00 |
| 2018/0216594 A1* | 8/2018 | Popp ..................... F02N 11/103 |

* cited by examiner

VEHICLE SYSTEM AND METHOD FOR REMOTE START OPERATION

FIELD

The present description relates generally to a vehicle system configured for remote start operation and a remote start method.

BACKGROUND/SUMMARY

Vehicles with automatic transmissions have been equipped with remote start capabilities, allowing for vehicle warm-up, during for example cold weather conditions, prior to a driver entering the vehicle. In automatic transmission vehicles, during shutdown operation the driveline is typically set in "park". When the transmission is in the park setting, a pawl typically immobilizes the transmission output shaft, allowing remote start to unfold in the vehicle without transferring motive power to the drive wheels. However, incorporating remote start capabilities into vehicles with manual transmissions presents several technical challenges. For example, drivers commonly shut-down the vehicle with the manual transmission in gear. If the transmission remains in gear during vehicle shut-down, motive power will be transferred to vehicle drive wheels during a subsequent remote start. As such, some vehicles may inhibit remote starting if the manual transmission is placed in gear during or after shutdown, constraining remote start capabilities.

Attempts have been made to expand remote start capabilities in manual transmission vehicles. One example approach is shown by Parada Centeno et al., in U.S. Pat. No. 9,915,303 B2, a vehicle system is disclosed where a parking brake is actively engaged and a clutch in a manual transmission is electronically disengaged prior to initiating engine remote start.

However, the inventors have recognized several drawbacks with Parada Centeno's remote start technique. For instance, the remote start method does not recognize if the parking brake is degraded or if the vehicle parked on a relatively steep slope. Therefore, if remote start were to occur while the parking brake is degraded and/or the vehicle is on a relatively steep slope the vehicle may be set in motion after the remote start. As such, the inventors have recognized a need to provide wheel-arresting redundancies in the vehicle to reduce the chance motive power being transferred from the engine to the wheels during remote engine start.

The inventors have recognized the abovementioned drawbacks and developed a method for operation of a vehicle system. The method includes automatically engaging a wheel-arresting device coupled to a wheel in the vehicle responsive to receiving a remote start request and while the vehicle is stationary. The method also includes implementing remote start operation in an engine when an electronically actuated clutch is automatically disengaged and subsequent to the automatic engagement of the wheel-arresting device. In such an example, the wheel-arresting device is distinct from a secondary vehicle brake. In this way, a wheel-arresting device such as an electric motor, a brake booster in a primary vehicle brake system, etc., is used to reduce the chance of vehicle motion occurring during remote start.

The wheel-arresting device may be engaged, in one example, responsive to determining the secondary vehicle brake is degraded and/or the vehicle is on a slope greater than a threshold value. In this way, conditions increasing the likelihood of unwanted vehicle motion subsequent to remote start may be identified and braking redundancies in the vehicle system may be deployed to account for the heightened chance of vehicle motion occurring subsequent to remote start.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Advantages and features of the present description will be apparent from the detailed description to follow, either taken alone or in conjunction with the accompanying figures shown below. It should be known that the description above is intended to introduce in a simplified matter a number of concepts that are described further in the detailed description. This summary is not intended to elucidate key features of the claimed subject material, the scope of which is defined uniquely by the claims that follow the detailed description. In addition, the claimed subject matter is not limited to implementations that solve any disadvantages noted above or in any part of this disclosure.

DETAILED DESCRIPTION

Figure 1:
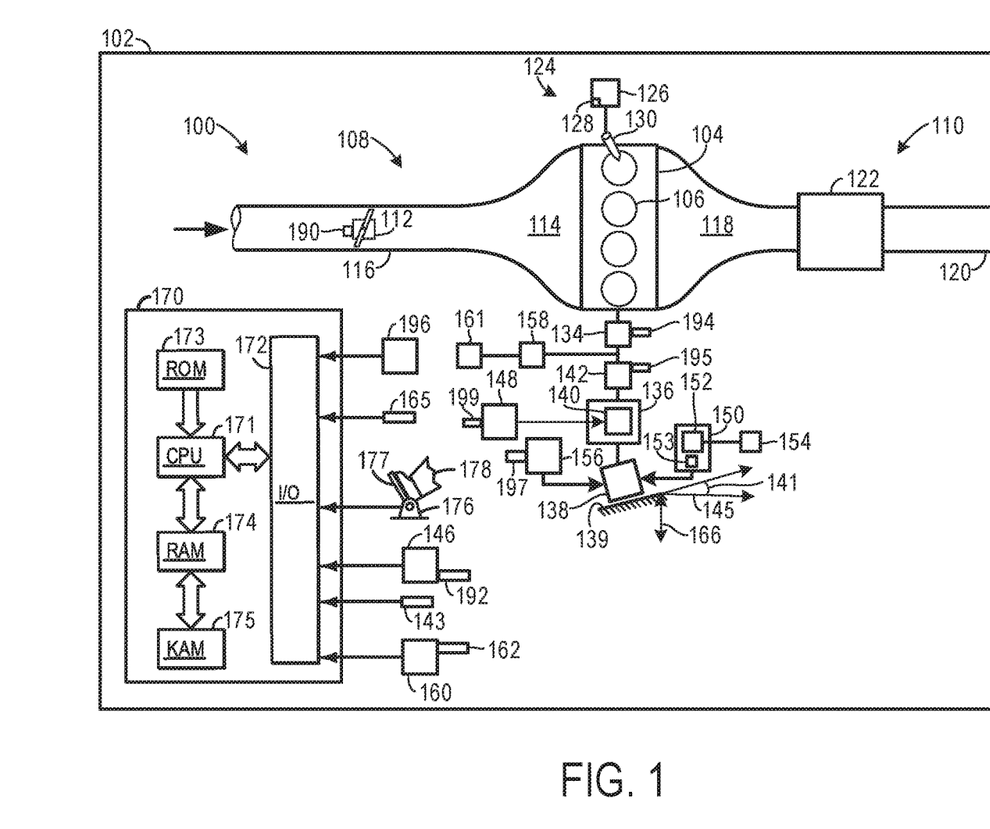
FIG. 1 shows an illustration of a vehicle with a manual transmission and an engine.
Figure 2:
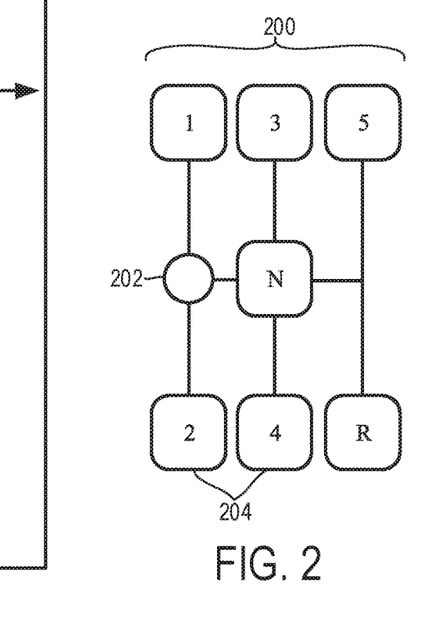
FIG. 2 shows an example of a gear selection interface in a manual transmission.
Figure 3:
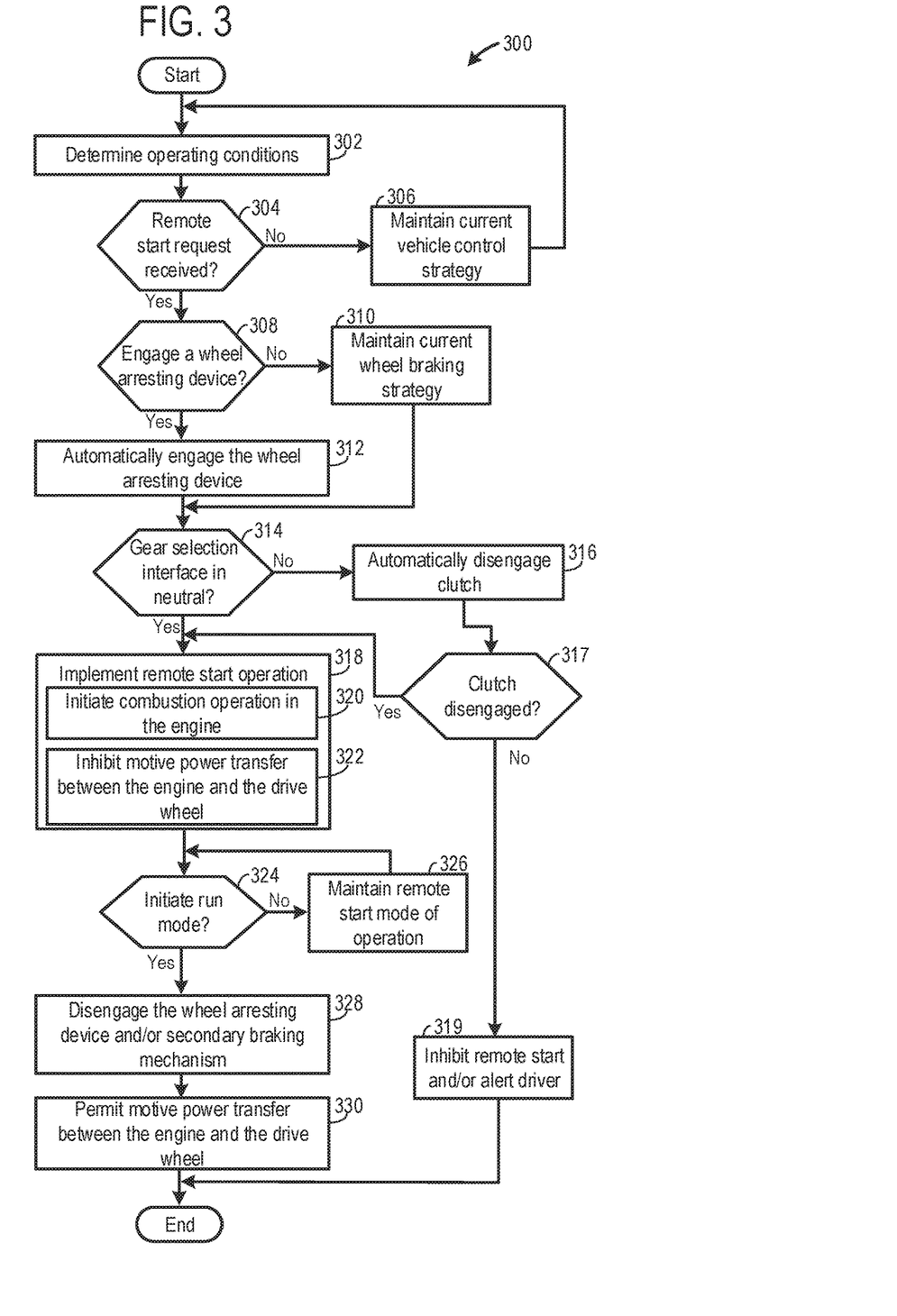
FIG. 3 shows a remote start method.
Figure 4:
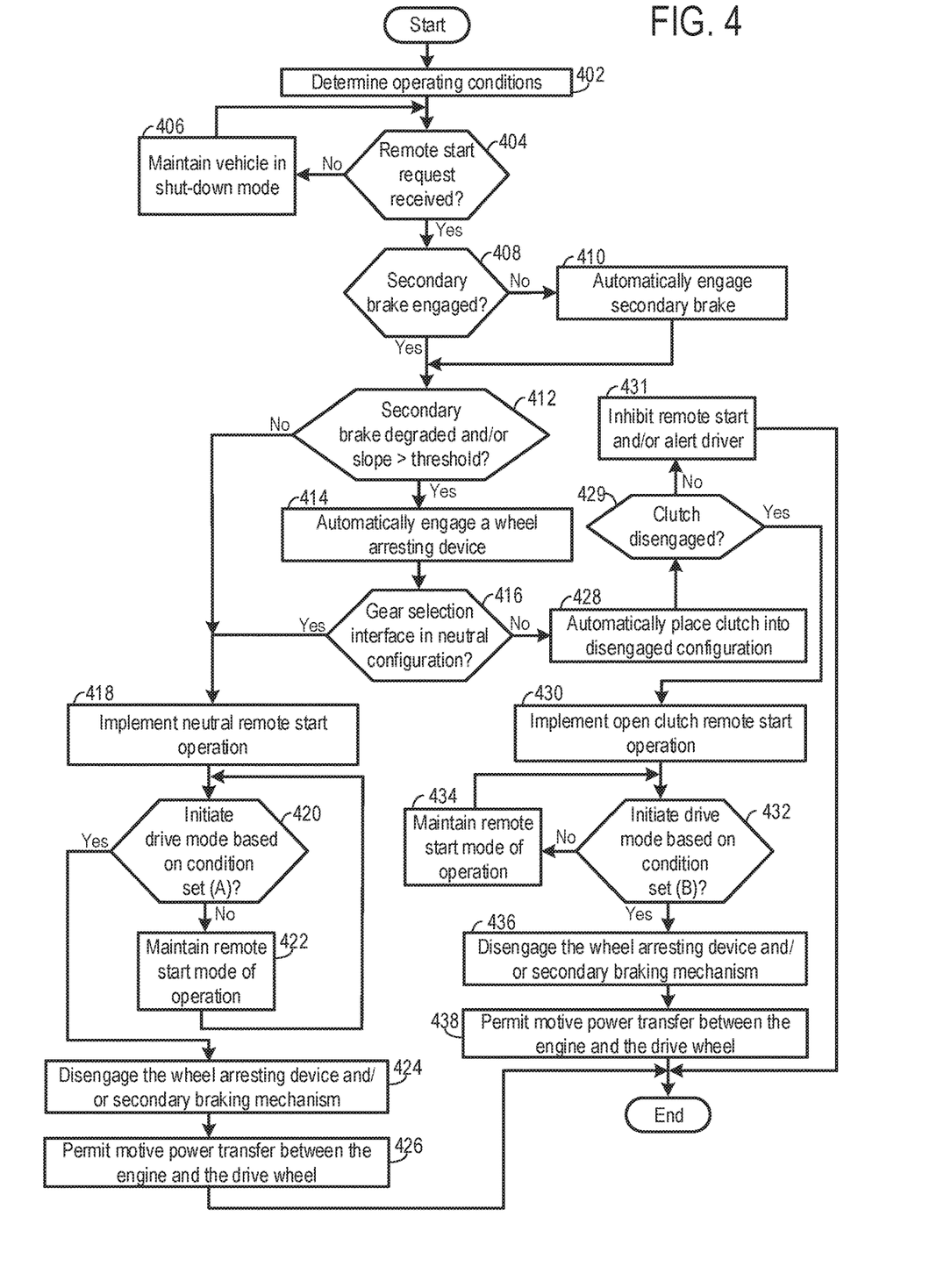
FIG. 4 shows a more detailed remote start method.
Figure 5:
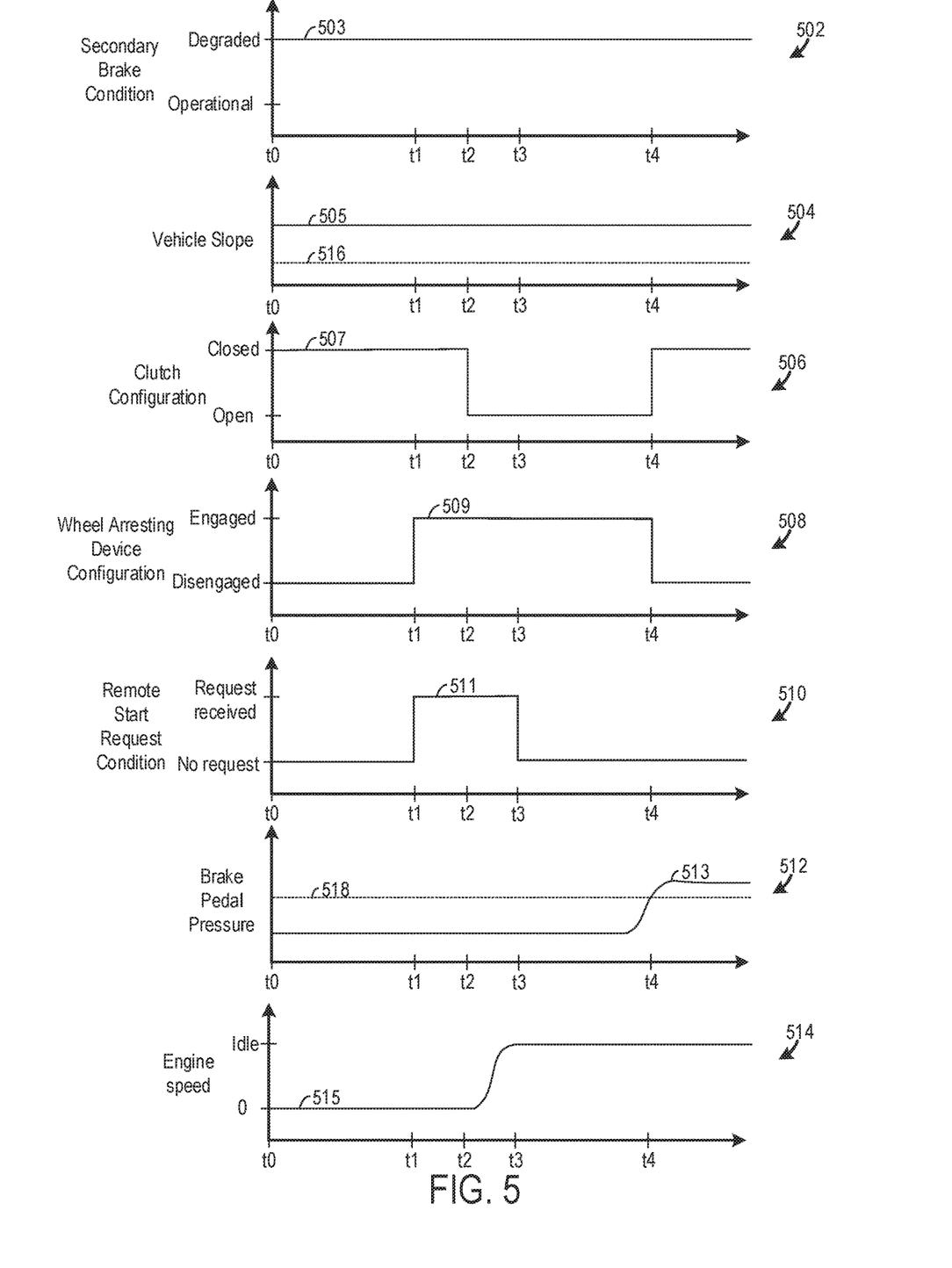
FIG. 5 shows a graphical representation a use-case remote start method.

The following description relates to a vehicle system with a manual transmission designed with remote start capabilities and a method for implementing a remote start sequence in the vehicle system. FIG. 1 illustrates a vehicle including an engine and a manual transmission. FIG. 2 depicts an example of a gear selection interface and a gear selection device included in a manual transmission. FIG. 3 shows a method for implementing a remote start process in a vehicle system with a manual transmission. FIG. 4 shows a more detailed method for implementing a remote start sequence in a vehicle system. FIG. 5 shows a graphical representation of a use-case remote start sequence.

Referring now to FIG. 1, a schematic depiction of a vehicle system 100 in a vehicle 102 is shown. The vehicle system 100 includes an engine 104 (e.g., internal combustion engine). The engine 104 has one or more cylinder(s) 106. Components such as intake valves, exhaust valves, etc., may be provided in the engine to allow a combustion process (e.g., four-stroke combustion cycle) to be carried out in the cylinders 106. The engine 104 includes an engine intake system 108 and an engine exhaust system 110. The engine intake system 108 includes a throttle 112 fluidly coupled to the engine intake manifold 114 via an intake passage 116. The engine exhaust system 110 includes an exhaust manifold 118 leading to an exhaust passage 120 that routes exhaust gas to the atmosphere. The engine exhaust system 110 may include one or more emission-control devices 122. The emission-control devices 122 may include a three-way catalyst, lean NOx trap, diesel particulate filter, oxidation catalyst, etc. It will be appreciate that other components may be included in the engine such as a variety of valves and sensors.

The vehicle 102 also includes a fuel delivery system 124. The fuel delivery system 124 includes a fuel tank 126 with a fuel pump 128 delivering fuel to a fuel injector 130. While a single fuel injector is shown, additional injectors may be provided for each cylinder. Furthermore, the fuel injector 130 is depicted as a direct injector. However, in additional or alternative examples, port injectors may be utilized. The fuel delivery system 124 may include additional components facilitating pressurized fuel delivery to the injectors such as valves, other fuel pumps, return fuel lines, etc. Fuel tank 126 may hold one or more liquid fuels such as gasoline, alcohol (e.g., ethanol, methanol, etc.), diesel, biodiesel, combinations thereof, etc.

The cylinders 106 are rotationally coupled to a crankshaft 134. Mechanical components such as piston rods may be used to establish the rotational connection between the cylinders and the crankshaft.

A manual transmission 136 is provided in the vehicle 102 and is designed to selectively provide rotational energy transfer between the crankshaft 134 and at least one drive wheel 138. To accomplish the rotational energy transfer the manual transmission 136 may include mechanical components such as a gearbox 140. The gearbox 140 may include a plurality of discrete gears. For instance, the gearbox 140 may include four speeds, five speeds, six speeds, etc.

The drive wheel 138 is shown positioned on a drive surface 139. An angle 141 of the drive surface 139 is also indicated in FIG. 1. A slope sensor 143 (e.g., accelerometer, inclinometer, combinations thereof, etc.) may be included in the vehicle 102 and provide sensory data to a controller 170 indicative of the angle of the vehicle and therefore the sloped surface on which it is positioned. The angle may be measured from an axis 145 perpendicular to a gravitational axis 166.

A flywheel may be provided between the crankshaft and the manual transmission. An electronically actuated clutch 142 may also be coupled to the manual transmission 136. The electronically actuated clutch 142 is configured to couple/decouple the manual transmission 135 from the crankshaft 134. The electronically actuated clutch 142 may include an electronic actuator, pressure plate, diaphragm spring, coil springs, etc. To elaborate, the electronically actuated clutch may include a clutch actuator (e.g., modular clutch actuator (MCA)) hydraulically coupled to the clutch 142, an electrically powered actuator, etc.

A clutch interface 146 (e.g., clutch pedal) is shown electronically coupled to a controller 170. The clutch interface 146 allows a driver to electronically engage/disengage the clutch 142. For instance, the controller 170 may send a clutch disengagement command to the clutch 142 responsive to depression of a clutch pedal. However, other suitable clutch interfaces have been envisioned such as buttons, levers, paddles, etc. A gear selection interface 148 (e.g., gearshift) is also included in the vehicle system 100 shown in FIG. 1. The gear selection interface 148 is configured to enable a driver to manually select a gear in the gearbox 140. To accomplish the manual gear selection functionality the gear selection interface 148 may include levers, knobs, shafts, etc., interacting with the gearbox.

FIG. 2 shows an example of a gear selection interface 200 in the form of a gearshift. However, other suitable types of gear selection interfaces have been contemplated. It will be understood that gear selection interface 200 is an example of the gear selection interface 148, depicted in FIG. 1.

The gear selection interface 200 includes a gear selector 202 (e.g., gear stick) and a plurality of discrete gears 204. In the illustrated example, the plurality of discrete gears include a neutral gear, a reverse gear, and a plurality of forward drive gears. However, other gear combinations may be used in other examples. Although five forward drive gears are depicted, the interface may include a different number of forward drive gears in other examples, such as three forward drive gears, four forward drive gears, six forward drive gears, etc. A driver may therefore manipulate the gear selector 202 to select an operating gear for the manual transmission.

Returning to FIG. 1, various braking systems are shown coupled to the drive wheel 138. However, it will be appreciated that the braking systems may also be coupled to non-drive wheels in the vehicle. To elaborate, a primary braking system 150 is coupled to the drive wheel 138 and/or non-drive wheels. The primary brake system 150 is designed to reduce the rotational speed of the drive wheel. The primary braking system 150 includes a brake booster 152 attached to a vacuum source 154. The vacuum source 154 may be a vacuum reservoir coupled to a vacuum pump, the intake manifold, etc., in one example. The brake booster 152 is designed to decrease the braking effort for actuating a braking device (e.g., brake caliper) in braking operation in the primary braking system 150. It will be appreciated that the braking effort may be applied by a driver to a brake pedal in the primary braking system. It will also be understood that the brake booster 152 may be automatically actuated during certain operating conditions. The primary braking system 150 may also include one or more brake devices 153 coupled to the drive wheel and/or non-drive wheels in the vehicle 102. The brake devices may be a disk brake device, drum brake device, combinations thereof, etc. It will be understood, that the primary braking system may be a hydraulically braking system, in one example. However, other brake actuation techniques have been envisioned such as air-actuated brakes, wire-actuated brakes, combinations thereof, etc.

The primary braking system may be at least partially controlled via a brake control interface 160 (e.g., brake pedal). In one example, the brake control interface 160 may be hydraulically coupled to the primary braking system 150. However, in other examples, the brake control interface may be electronically connected to the primary braking system.

The vehicle system 100 may further include a secondary vehicle brake 156 coupled to the drive wheel 138 and/or non-drive wheels in the vehicle 102 and configured to selectively apply a braking force to the vehicle wheels. The secondary vehicle 156 may include an actuation assembly (e.g., levers, wires, hydraulic lines, etc.), a braking device (e.g., brake caliper), etc., to achieve the manual wheel braking functionality. The secondary vehicle brake 156 may be a manually operated parking brake (e.g., hand actuated brake, foot actuated brake, etc.) in one example. Further, in one example, the secondary vehicle brake 156 may also be configured for automatic engagement and disengagement. For instance, the secondary vehicle brake 156 may include an actuator receiving control commands from the controller 170 to enable automatic engagement/disengagement of the secondary vehicle brake. As described herein automatic actuation, engagement, disengagement, etc., of a component, device, etc., refers to a controller-induced operation not directly requested by the driver through interaction with an interface (e.g., brake pedal, accelerator pedal, etc.) For instance, automatically engagement of a wheel-arresting device will occur without a user requesting actuation of the wheel-arresting device via an input device (e.g., pedal, button, etc.) corresponding to the wheel-arresting device.

The vehicle system 100 may also include an electric motor 158. Thus, the vehicle 102 may be a hybrid vehicle, in such an example. The electric motor 158 is shown rotationally coupled to the crankshaft 134. Therefore, in some examples, vehicle 102 may be a hybrid vehicle with multiple sources of torque available to the at least one drive wheel 138. In such an example, the electric motor may function as a motor/generator. In the motor mode, the electric motor 158 may deliver torque to the crankshaft. Under certain conditions, the electric motor 158 may be operated to prevent rotation of the drive wheel 138. For instance, during a remote start sequence the electric motor 158 may deliver torque to the crankshaft in a rotational direction opposite the direction of drive wheel motion caused by the vehicle being parked on a slope. As such, the electric motor may apply torque to the crankshaft to prevent the vehicle from traveling in a forward or backward direction. In other examples, vehicle 102 may be a vehicle with only an engine.

The electric motor 158 is electrically coupled to an energy storage device 161 (e.g., battery, flywheel, capacitor, combinations thereof, etc.). Therefore, in one mode the electric motor 158 may receive electrical power from the energy storage device 161 to provide torque to the crankshaft 134. Additionally, in one example, the electric motor 158 may also be operated as a generator to provide electrical power to charge energy storage device 161, for example during a braking operation. Further, in some examples, additional clutches may be provided in the vehicle system 100 to enable connection/disconnection of the electric motor 158 from the crankshaft 134.

To elaborate the controller 170 may send a signal to an actuator in each clutch to engage or disengage the clutch, to connect or disconnect crankshaft 134 from the electric motor 158 and the components connected thereto, and/or connect or disconnect electric motor 158. Furthermore, the powertrain may be configured in various manners including as a parallel, a series, or a series-parallel hybrid vehicle.

The brake booster 152 and/or the electric motor 158 may be generally referred to as wheel-arresting devices distinct from the secondary vehicle brake 156. Therefore, the brake booster and the electric motor may each function to inhibit motion of the drive wheel 138 during selected operating conditions, described in greater detail herein.

The vehicle 102 also includes the controller 170. The controller 170 is shown in FIG. 1 as a conventional microcomputer including: microprocessor unit 171, input/output ports 172, read-only memory 173, random access memory 174, keep alive memory 175, and a conventional data bus. However, numerous controller arrangements have been envisioned. Additionally, the controller 170 is also configured to receive a pedal position from a pedal position sensor 176 couples to an accelerator control interface 177 (e.g., accelerator pedal) actuated by an operator 178.

Additionally, the controller 170 may be configured to trigger one or more actuators and/or send commands to components. For instance, the controller 170 may trigger adjustment of the brake booster 152, the secondary vehicle brake 156, the electronically actuated clutch 142, the engine 104, the throttle 112, the electric motor 158, the fuel delivery system 124, etc. Specifically in one example, the controller 170 may send signals to an actuator in the brake booster 152 to inhibit motion of the drive wheel. In another example, the controller may send signals to an actuator in the electronically actuated clutch 142 to engage or disengage the clutch.

The controller 170 may also receive signals from sensors such as sensors in the engine 104, a throttle position sensor 190, a clutch interface sensor 192, the slope sensor 143, engine speed sensor 194, a clutch sensor 195, a secondary vehicle brake sensor 197, a gear selection interface sensor 199, a brake control interface sensor 162, a vehicle speed sensor 165, etc. The secondary vehicle brake sensor 197 may generate a signal indicative of engagement or disengagement of the secondary vehicle brake. To elaborate, the secondary vehicle brake sensor 197 may generate a signal indicative of the degree of engagement of the secondary vehicle brake. Thus, the secondary brake sensor signal may allow the controller to determine if the secondary vehicle brake is degraded. Degradation, in one example, may be determined based on a threshold magnitude of secondary brake engagement. Additionally, the gear selection interface sensor 199 may generate a signal indicative of the position of the gear selector in the gear selection interface 200. The controller 170 may also receive a remote start request from a remote start device 196. The remote start device 196 may be a key fob, a remote computing device (e.g., smartphone, wearable device, laptop, etc.), etc. Thus, the remote start device 196 may be configured to electronically communicate (e.g., wired and/or wireless communication) with the controller 170. Therefore, in one example, the remote start device 196 may include a communication interface such as an antenna.

The controller 170 may be configured to implement remote start operation in the engine. To implement remote start the engine is operated to perform cyclical combustion and motive power transfer between the engine and the drive wheel is inhibited. Different entry conditions may be satisfied in order to begin remote start operation. The entry conditions may include a request for a remote start from the remote start device 196. Various wheel-braking mechanisms may also be engaged prior to engine remote start. For instance, the secondary vehicle brake 156 (e.g., parking brake) may be engaged prior to remote start. However, if the parking brake is degraded or the vehicle is on a slope greater than a threshold value, wheel braking redundancies may be implemented prior to remote start. For example, the electric motor 158 may be energized to stop vehicle wheel movement and/or the brake booster 152 may be used to actuate a braking device in the primary braking system 150. Consequently, different vehicle wheel braking mechanisms may be sequentially deployed under a set of operating conditions where unwanted vehicle movement is more likely to occur during remote start. Additionally, when the gear selection interface 148 is in an in-gear configuration the clutch may be automatically opened prior to remote start to prevent vehicle creep from occurring during remote start. The vehicle may be placed in a run mode subsequent to remote start mode. In the run mode the vehicle is prepared for vehicle driving. Therefore, in the run mode the braking redundancies actuated prior to remote start may be disengaged and the clutch may be engaged. It will be appreciated that the remote start mode and the run mode may be mutually exclusive modes and therefore may be transitioned between based on operating conditions. Therefore, in such an example, when the remote start mode is occurring the run mode is not occurring and vice-versa. Different remote start methods are described in greater detail herein with regard to FIGS. 3-5.

FIG. 3 shows a method 300 for remotely starting a vehicle. Therefore, it will be understood that the vehicle is shutdown prior to implementation of the method 300. The method 300 as well as the other methods described herein may be carried out by the vehicle, vehicle systems, components, etc., described above with regard to FIGS. 1 and 2. However, in other examples, the method 300 and/or the other methods described herein may be carried out using other suitable vehicles, vehicle systems, components, etc. Instructions for carrying out method 300 and/or the other methods described herein may be at least partially executed by a controller (e.g., controller 170) based on instructions stored in memory (e.g., non-transitory memory) of the controller and in conjunction with signals received from sensors, such as the sensors described above with regard to FIGS. 1 and 2. It will also be understood that the method steps may include the controller sending command signals to actuators in the commanded component, the command triggering actuators in the commanded component to adjust the component, as desired.

At 302 the method includes determining vehicle operating conditions. The operating conditions may include engine speed, vehicle speed, clutch configuration, vehicle angle, secondary brake engagement state, gear selector position, etc.

At 304 the method includes determining if a remote start request has been received. For instance, it may be determined if a remote device has generated and sent a remote start request signal to the vehicle controller. It will be understood that steps 302-324 may take place when the vehicle is stationary. Additionally, the remote start request may be initiated by a driver located external to the vehicle.

If a remote start request has not been received (NO at 304) the method moves to 306 where the method includes maintaining the current vehicle control strategy. For instance, the vehicle may remain in a state of shutdown where the vehicle is stationary and the engine is not performing combustion.

On the other hand, if a remote start request has been received (YES at 304) the method advances to 308. At 308 the method includes determining if a wheel-arresting device should be engaged. The wheel-arresting device may include an electric motor rotationally coupled to the crankshaft, in one example. Additionally or alternatively, the wheel-arresting device may include a brake booster in a primary braking system. It will be appreciated that the wheel-arresting device is distinct from a secondary vehicle brake (e.g., parking brake). The wheel-arresting device engagement determination may be carried out based on several factors such as if it has been determined that the secondary vehicle brake is degraded and/or if the vehicle is on a surface sloped at an angle greater than a threshold value (e.g., 2 degrees, 3 degrees, 5 degrees, 10 degrees, etc.). For example, it may be determined that the wheel-arresting device should be engaged when it is determined that the secondary vehicle brake is degraded and when the vehicle is on a slope greater than the threshold value. However, in other examples, it may be determined that the wheel-arresting device should be engaged when one of the aforementioned conditions is met (i.e., secondary vehicle brake is degraded or vehicle slope>the threshold value.

If it is determined that the wheel-arresting device should not be engaged (NO at 308) the method moves to 310. At 310 the method includes maintaining the current wheel braking strategy. For instance, engagement of the secondary vehicle brake (e.g., parking brake) may be sustained.

On the other hand, if it is determined that the wheel-arresting device should be engaged (YES at 308) the method advances to 312. At 312 the method includes automatically engaging the wheel-arresting device. For instance, a brake booster and/or electric motor may be commanded to be engaged to prevent movement of a vehicle wheel.

Next at 314 the method includes determining if a gear selection interface is in a neutral position. For example, a sensor coupled to the gear selection interface may be sampled to determine the position of the gear selector. However, in other examples, the sensor used to determine if the transmission is in neutral may be located in the gearbox. In one example, remote start in the engine may be inhibited when the electronically actuated clutch is engaged. In this way, unwanted motive power transfer between the engine and the drive wheel may be avoided during remote start.

If it is determined that the gear selection interface is not in neutral (NO at 314) the method moves to 316 where the method includes automatically disengaging the clutch. For instance, an electronic actuator in the electronically actuated clutch may be commanded to disengage the clutch. At 317 the method includes determining if the clutch is disengaged. If the clutch is not disengaged (NO at 317) the method moves to 319 where the method includes inhibiting remote start and/or alerting the driver. However, if it is determined that the clutch is disengaged (YES at 317) the method moves to 318. If it is determined that the gear selection interface is in neutral (YES at 314) the method moves to 318. At 318 the method includes implementing remote start operation. Implementing remote start operation may include steps 320-322. At 320 the method includes initiating combustion operation in the engine. For example, four stroke combustion cycles may be implemented in the engine. At 322 the method includes inhibiting motive power transfer between the engine and the drive wheel. For instance, clutch disengagement may be sustained.

At 324 the method includes determining if a run mode in the vehicle should be initiated. One or more entry condition may be satisfied in order to initiate the run mode. For example, the run mode may be initiated when a pressure applied to a brake control interface (e.g., brake pedal) exceeds a threshold value (e.g., a non-zero value) and/or a start button is actuated. The threshold value may be calculated based on the degree of secondary brake degradation, the slope of the vehicle, etc. In another example, run mode implementation may be delayed until the driver releases the brake control interface (e.g., brake pedal) and/or presses an accelerator pedal. In another example, the run mode may be initiated when a gear selection interface is placed in a neutral configuration. Therefore, in such an example, initiation of the run mode may be delayed until the gear selection interface is placed in a neutral configuration.

If it is determined that the run mode should not be initiated (NO at 324) the method moves to 326 where the method includes maintaining the remote start mode of operation where combustion operation in the engine (e.g., idle operation) is maintained while motive power transfer from the engine to the drive wheel is inhibited.

On the other hand, if it is determined that the run mode should be initiated (YES at 324) the methods proceeds to 328. At 328 the method includes disengaging the wheel-arresting device and/or secondary braking mechanism. Next at 330 the method includes permitting motive power transfer between the engine and the drive wheel. Permitting motive power transfer between the engine and drive wheel may include engaging the electronically actuated clutch. Thus, steps 328-330 may be included in the implementation of a drive mode.

FIG. 4 shows a detailed method 400 for carrying out remote start operation in a vehicle system. At 402 the method includes determining vehicle operating conditions.

The set of operating conditions ascertained at step 402 may include the operating conditions discussed with regard to step 302, shown in FIG. 3.

At 404 the method includes determining if a remote start request has been received. If a remote start request has not been received (NO at 404) the method moves to 406 where the method includes maintaining the vehicle a shut-down mode where the internal combustion engine is not carrying out combustion operation. It will be understood that method 400 may take place when the vehicle is stationary and a driver is outside the vehicle.

If a remote start request has been received (YES at 404) the method moves to 408 where the method includes determining if the secondary brake is engaged. If it is determined that the secondary brake is not engaged the method proceeds to 410. At 410 the method includes automatically engaging the secondary brake. For example, the parking brake may be closed via an actuator electronically commanded via the controller.

If it is determined that the secondary brake is engaged the method moves to 412 where the method includes determining if the secondary brake is degraded and/or the vehicle is on a slope greater than a threshold value (e.g., 2 degrees, 3 degrees, 4 degrees, etc.). In this way, conditions increasing the likelihood of the vehicle moving during remote start operation are determined. Additionally, degradation of the secondary brake may be ascertained using the pressure applied to a wheel by the secondary brake and/or the position of the secondary brake actuator, in one example.

If it is determined that the secondary brake is degraded and/or the vehicle is on a slope greater than the threshold value (YES at 412) the method proceeds to 414. At 414 the method includes automatically engaging a wheel-arresting device (e.g., brake booster, electric motor, etc.). Next at 416 the method includes determining if the gear selection interface is in the neutral configuration. If the gear selection interface is in the neutral configuration (YES at 416) the method moves to 418. Additionally, if it is determined that the secondary brake is not degraded and/or the vehicle is not on a slope greater than the threshold value (NO at 412) the method moves to 418.

At 418 the method includes implementing neutral remote start operation. At 420 the method includes determining if a drive mode should be initiated based on a first set of operating conditions. For instance, the drive mode may be initiated when the brake control interface (e.g., brake pedal) is pressed and/or a start button is actuated. However, other sets of operating conditions may be used to initiate the drive mode. For example, the drive mode may be implemented when the shift lever is in neutral and inhibited when the shift lever is in-gear.

If the first set of operating conditions is not satisfied (NO at 420) the method moves to 422 where the method includes maintaining the vehicle in the remote start mode of operation. On the other hand, if the first set of operating conditions is satisfied (YES at 420) the method moves to 424 where the method includes disengaging the wheel-arresting device and/or secondary braking mechanism. Next at 426 the method includes permitting motive power transfer between the engine and the drive wheel.

If it is determined that the gear selection interface is not in neutral (NO 416) the method moves to 428 where the method includes automatically placing clutch into disengaged configuration. In this way, the crankshaft may decoupled from the drive wheel to prevent rotational energy transfer between said components. Next at 429 the method includes determining if the clutch is disengaged. If the clutch is not disengaged (NO at 429) the method moves to 431 where the method includes inhibiting remote start and/or alerting the driver. However, if it is determined that the clutch is disengaged (YES at 429) the method moves to 430.

At 430 the method includes implementing open clutch remote start operation. At 432 the method includes determining if the drive mode should be initiated based on a second set of conditions. The second set of conditions differ from the first set of conditions in step 420. For instance, the second set of conditions may include a condition where a pressure applied to the brake pedal surpasses a threshold value. The threshold value may be greater than a pressure value indicative of a drive pressing the brake pedal at step 420. Additionally or alternatively, the second set of conditions may include a condition where the driver presses an accelerator pedal and/or a start button. In this way, unwanted vehicle creep occurring after run mode is initiated can be avoided, thereby providing the driver with a smoother starting experience.

If it is determined that the second set of operating conditions for initiating the drive mode are not satisfied (NO at 432) the method moves to 434 where the method includes maintaining the vehicle in the remote start mode of operation. On the other hand, if it is determined that the second set of operating conditions for initiating the drive mode have been satisfied (YES at 432) the method advances to 436. At 436 the method includes disengaging the wheel-arresting device and/or secondary braking mechanism. Next at 438 the method includes permitting motive power transfer between the engine and the drive wheel. Method 400 allows the operating conditions under which remote start can occur to be expanded by automatically implementing braking redundancies in the vehicle prior to remotely starting the engine to reduce the chance of unintended vehicle movement.

Turning to FIG. 5, a use-case remote start sequence is graphically depicted. In each graph time is indicated on the abscissa. Although, numerical time values are not indicated on the abscissa the relative timing of events may be inferred from graphs.

Graph 502 indicates a secondary brake condition on the ordinate with values of "degraded" and "operational". Plot 503 indicates the secondary brake is degraded from t0 to t4. The "degraded" value indicates the secondary brake is not operating as desired. For instance, the secondary brake may be degraded when the brake applies a wheel stopping force less than a desired value and/or when the secondary brake is not capable of engagement. Graph 504 indicates vehicle slope on the ordinate. Plot 505 indicates that the vehicle slope is greater than a threshold value 516 from t0 to t4.

Graph 506 indicates clutch configuration on the ordinate with values of "closed" and "open". The "closed" value indicates a clutch configuration where one of the gears in the manual transmission is rotationally coupled to the crankshaft. The "open" value indicates a clutch configuration where the gears in the manual transmission are rotationally disconnected from the crankshaft. Plot 507 indicates the clutch is placed in the open configuration from t2 to t4 and is placed in a closed configuration from t0 to t2 and subsequent to t4.

Graph 508 indicates wheel-arresting device configuration on the ordinate with values of "engaged" and "disengaged". The "engaged" value indicates the wheel-arresting device is preventing movement of the wheel and the "disengaged" value denotes the inverse. Plot 509 indicates the wheel-arresting device is disengaged from t0 to t1, engaged from t1 to t4, and disengaged subsequent to t4.

Graph 510 indicate a remote start request condition on the ordinate with a "request received" value corresponding to a condition where a remote start request is received by the vehicle and "no request" value denoting a remote start request has not been received by the vehicle. Plot 511 indicates that a remote start request is received at t1 and persists until t3.

Graph 512 indicates brake pedal pressure on the ordinate. Plot 513 shows the brake pedal pressure surpassing a threshold value 518 at t4. Graph 514 indicates engine speed on the ordinate. Plot 515 indicates an increase from 0 RPM to idle from t2 to t3.

At t1 a remote start request is received and the secondary brake is degraded and the vehicle is on a slope greater than a threshold value (e.g., 2 degrees, 3 degrees, 5 degrees, etc.). Responsive to receiving the remote start request and determining the secondary brake is degraded and the vehicle slope is greater than the threshold value the wheel-arresting device (e.g., brake booster, electric motor, combinations thereof, etc.) is engaged at t1. Next at t2 the clutch is automatically placed in an open configuration. Subsequent to opening the clutch between t2 and t3 the engine is started and engine speed is increased until idle is reached. In this way, the wheel-arresting device is actuated to prevent wheel movement prior to opening the clutch in a remote start sequence.

At t4 the clutch is placed in an engaged configuration responsive to the brake pedal pressure surpassing a threshold value. In other examples, the clutch may be engaged when the brake pedal pressure surpasses a threshold value and is subsequently released.

The technical effect of engaging a wheel-arresting device during a remote start sequence in response to determining a secondary brake has been degraded and/or a vehicle is on a slope greater than a threshold value is to decrease the likelihood of unwanted vehicle movement occurring during remote start.

The invention will be further described in the following paragraphs. In one aspect, a method for operation of a vehicle system is provided. The method includes responsive to receiving a remote start request and while the vehicle is stationary, automatically engaging a wheel-arresting device coupled to a wheel in the vehicle; and when an electronically actuated clutch is automatically disengaged and subsequent to the automatic engagement of the wheel-arresting device, implementing remote start operation in an engine; where the wheel-arresting device is distinct from a secondary vehicle brake. In one example, the method may further comprise, in response to a pressure applied to a brake control interface in a primary braking system surpassing a threshold value, initiating a run mode in the vehicle where motive power transfer between the engine and a drive wheel is permitted. In another example the method may further comprise delaying transfer of motive power from the engine to the drive wheel until the brake control interface is manually released and/or the driver actuates an accelerator control interface. In another example, the method may further comprise inhibiting initiation of a run mode until a gear selection interface is manually placed in a neutral position, where in the run mode motive power transfer between the engine and a drive wheel is permitted. In another example, the method may further comprise, responsive to receiving the remote start request and prior to automatically engaging the wheel-arresting device, automatically engaging the secondary vehicle brake. In yet another example, the method may further comprise inhibiting remote starting of the engine when the electronically actuated clutch is engaged.

In another aspect, a vehicle system in a vehicle is provided that comprises an engine; an electronically actuated clutch configured to selectively rotationally couple a manual transmission to the engine; a drive wheel rotationally coupled to the manual transmission; and a controller with computer readable instructions stored on non-transitory memory that when executed during a remote start command condition where a remote start request has been received and the vehicle is stationary, cause the controller to: automatically engage a wheel-arresting device coupled to a wheel in the vehicle; and when the electronically actuated clutch is automatically disengaged and subsequent to the automatic engagement of the wheel-arresting device, implement remote start operation in an engine where combustion operation is carried out in the engine and motive power transfer between the engine and a drive wheel is inhibited; where the wheel-arresting device is distinct from a secondary vehicle brake.

In another aspect, a method for operation of a vehicle system in a vehicle is provided that comprises, when the vehicle is stationary and directly responsive to receiving a remote start request and determining degradation of a secondary vehicle brake, automatically engaging a wheel-arresting device coupled to a wheel of the vehicle; and when an electronically actuated clutch coupled to a manual transmission is automatically disengaged and subsequent to the automatic engagement of the wheel-arresting device, implementing remote start operation in an engine where combustion operation is carried out in the engine and motive power transfer between the engine and a drive wheel are inhibited; where the wheel-arresting device is distinct from a secondary vehicle brake. In one example, the method may further comprise, in response to a pressure applied to a brake control interface in a primary braking system by a driver exceeding a threshold value, initiating a run mode in the vehicle; and transferring motive power from the manual transmission to the drive wheel when the driver releases the brake control interface and/or the driver actuates an accelerator control interface.

In any of the aspects or combinations of the aspects, the wheel-arresting device may include a brake booster in a primary vehicle brake system.

In any of the aspects or combinations of the aspects, the wheel-arresting device may include an electric motor rotationally coupled to a manual transmission coupled to the electronically actuated clutch.

In any of the aspects or combinations of the aspects, automatically engaging the wheel-arresting device may be implemented in response to determining the secondary vehicle brake is degraded.

In any of the aspects or combinations of the aspects, the secondary vehicle brake may be a manually operated parking brake.

In any of the aspects or combinations of the aspects, automatically engaging the wheel-arresting device may be implemented in response to determining the vehicle is on a surface sloped at an angle greater than a threshold value.

In any of the aspects or combinations of the aspects, the wheel-arresting device may include a brake booster coupled to a vacuum reservoir in a primary braking system including a brake device coupled to the drive wheel.

In any of the aspects or combinations of the aspects, the wheel-arresting device may include an electric motor rotationally coupled to the manual transmission and where the electric motor is configured to transfer motive power to the drive wheel.

In any of the aspects or combinations of the aspects, the controller may include computer readable instructions stored on the non-transitory memory that when executed during an application of a pressure to a brake control interface in a primary braking system greater than a threshold value, cause the controller to: initiate a run mode in the vehicle where motive power transfer between the engine and a drive wheel is permitted.

In any of the aspects or combinations of the aspects, the controller may include computer readable instructions stored on the non-transitory memory that when executed during a release of the brake control interface and an actuation of an accelerator control interface, cause the controller to: transfer motive power from the engine to the drive wheel.

In any of the aspects or combinations of the aspects, the wheel-arresting device may include an electric motor and/or a brake booster and where the brake booster and/or the electric motor is/are automatically engaged directly responsive to determining the vehicle is on a surface sloped at an angle greater than a threshold value and/or determining the secondary vehicle brake is degraded.

In any of the aspects or combinations of the aspects, the method may further comprise when the manual transmission system is in an in-gear arrangement inhibiting remote starting of the internal combustion engine.

In any of the aspects or combinations of the aspects, the method may further comprise, prior to automatically engaging the wheel-arresting device and responsive to receiving the remote start request, automatically shifting the manual transmission into the neutral arrangement from an in-gear arrangement.

In another representation, a vehicle remote start method is provided. The vehicle remote start method comprises actuating a wheel-arresting device prior to engine remote start when a parking brake is degraded and/or a vehicle slope exceeds a threshold value.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller. However, in some examples, at least a portion of the steps may be passively implemented.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operation of a vehicle system, comprising:
responsive to receiving a remote start request and while a vehicle is stationary, automatically engaging a wheel-arresting device coupled to a wheel in the vehicle;
when an electronically actuated clutch is automatically disengaged and subsequent to the automatic engagement of the wheel-arresting device, implementing remote start operation in an engine; and
in response to a pressure applied to a brake control interface in a primary braking system surpassing a threshold value, initiating a run mode in the vehicle where motive power transfer between the engine and a drive wheel is permitted;
where the wheel-arresting device is distinct from a secondary vehicle brake.

2. The method of claim 1, further comprising delaying transfer of motive power from the engine to the drive wheel until the brake control interface is manually released and/or a driver actuates an accelerator control interface.

3. The method of claim 1, further comprising, inhibiting initiation of the run mode until a gear selection interface is manually placed in a neutral position, where in the run mode motive power transfer between the engine and the drive wheel is permitted.

4. The method of claim 1, where the wheel-arresting device includes a brake booster in a primary vehicle brake system.

5. The method of claim 1, where the wheel-arresting device includes an electric motor rotationally coupled to a manual transmission coupled to the electronically actuated clutch.

6. The method of claim 1, where automatically engaging the wheel-arresting device is implemented in response to determining the secondary vehicle brake is degraded.

7. The method of claim 1, where the secondary vehicle brake is a manually operated parking brake.

8. The method of claim 1, where automatically engaging the wheel-arresting device is implemented in response to determining the vehicle is on a surface sloped at an angle greater than a threshold value.

9. The method of claim 8, further comprising, responsive to receiving the remote start request and prior to automatically engaging the wheel-arresting device, automatically engaging the secondary vehicle brake.

10. The method of claim 1, further comprising inhibiting remote starting of the engine when the electronically actuated clutch is engaged.

11. A vehicle system in a vehicle, comprising:
an engine;
an electronically actuated clutch configured to selectively rotationally couple a manual transmission to the engine;
a drive wheel rotationally coupled to the manual transmission; and
a controller with computer readable instructions stored on non-transitory memory that when executed, during a remote start command condition where a remote start request has been received and the vehicle is stationary, cause the controller to:
automatically engage a wheel-arresting device coupled to a wheel in the vehicle; and
when the electronically actuated clutch is automatically disengaged and subsequent to the automatic engagement of the wheel-arresting device, implement remote start operation in an engine where combustion operation is carried out in the engine and motive power transfer between the engine and the drive wheel is inhibited;
where the wheel-arresting device is distinct from a manually operated parking brake.

12. The vehicle system of claim 11, where the wheel-arresting device includes a brake booster coupled to a vacuum reservoir in a primary braking system including a brake device coupled to the drive wheel.

13. The vehicle system of claim 11, where the wheel-arresting device includes an electric motor rotationally coupled to the manual transmission and where the electric motor is configured to transfer motive power to the drive wheel.

14. The vehicle system of claim 11, where the controller includes computer readable instructions stored on the non-transitory memory that when executed during an application of a pressure to a brake control interface in a primary braking system greater than a threshold value, cause the controller to:
initiate a run mode in the vehicle where motive power transfer between the engine and a drive wheel is permitted.

15. The vehicle system of claim 14, where the controller includes computer readable instructions stored on the non-transitory memory that when executed during a release of the brake control interface and an actuation of an accelerator control interface, cause the controller to:
transfer motive power from the engine to the drive wheel.

16. A method for operation of a vehicle system in a vehicle, comprising:
when the vehicle is stationary and directly responsive to receiving a remote start request and determining degradation of a secondary vehicle brake, automatically engaging a wheel-arresting device coupled to a wheel of the vehicle; and
when an electronically actuated clutch coupled to a manual transmission is automatically disengaged and subsequent to the automatic engagement of the wheel-arresting device, implementing remote start operation in an engine where combustion operation is carried out in the engine and motive power transfer between the engine and a drive wheel are inhibited;
where the wheel-arresting device is distinct from the secondary vehicle brake; and
where the wheel-arresting device includes an electric motor and/or a brake booster and where the brake booster and/or the electric motor is/are automatically engaged directly responsive to determining the vehicle is on a surface sloped at an angle greater than a threshold value and/or determining the secondary vehicle brake is degraded.

17. The method of claim 16, further comprising, in response to a pressure applied to a brake control interface in a primary braking system by a driver exceeding a threshold value, initiating a run mode in the vehicle; and
transferring motive power from the manual transmission to the drive wheel when the driver releases the brake control interface and/or the driver actuates an accelerator control interface.

* * * * *